United States Patent [19]
Wald et al.

[11] Patent Number: 5,794,852
[45] Date of Patent: Aug. 18, 1998

[54] BOOM SUSPENSION ASSEMBLY

[75] Inventors: Kevin Wald, Montevideo; Robin Carlson, Hopkins; Richard Moen, Starbuck, all of Minn.

[73] Assignee: Iboco, Inc., Benson, Minn.

[21] Appl. No.: 555,638

[22] Filed: Nov. 8, 1995

[51] Int. Cl.[6] .................................................. B05B 1/20
[52] U.S. Cl. .................................................. 239/167
[58] Field of Search .......................... 239/159, 164, 239/166, 167, 169, 172, 175, 176; 267/249, 250, 289, 291

[56] References Cited

U.S. PATENT DOCUMENTS

| | | | |
|---|---|---|---|
| 3,972,476 | 8/1976 | Hall | 239/167 |
| 4,427,154 | 1/1984 | Mercil | 239/167 X |
| 4,441,655 | 4/1984 | Blumhardt | 239/167 X |
| 4,598,830 | 7/1986 | Fletcher | 239/166 |

*Primary Examiner*—Andres Kashnikow
*Assistant Examiner*—Steven J. Ganey
*Attorney, Agent, or Firm*—Westman, Champlin & Kelly, P.A.

[57] ABSTRACT

A boom assembly is provided for use on a vehicle. The boom assembly utilizes various suspension components which absorb and damp a significant amount of various loads imparted on the boom assembly during operation of the vehicle. The boom assembly reduces the loads imparted on the booms when the vehicle pitches and rolls. By reducing the loads created by vehicle pitching and rolling, the booms receive a softer and smoother ride which increases the lifetime of the booms and lengthens the time between repair of the booms.

6 Claims, 5 Drawing Sheets

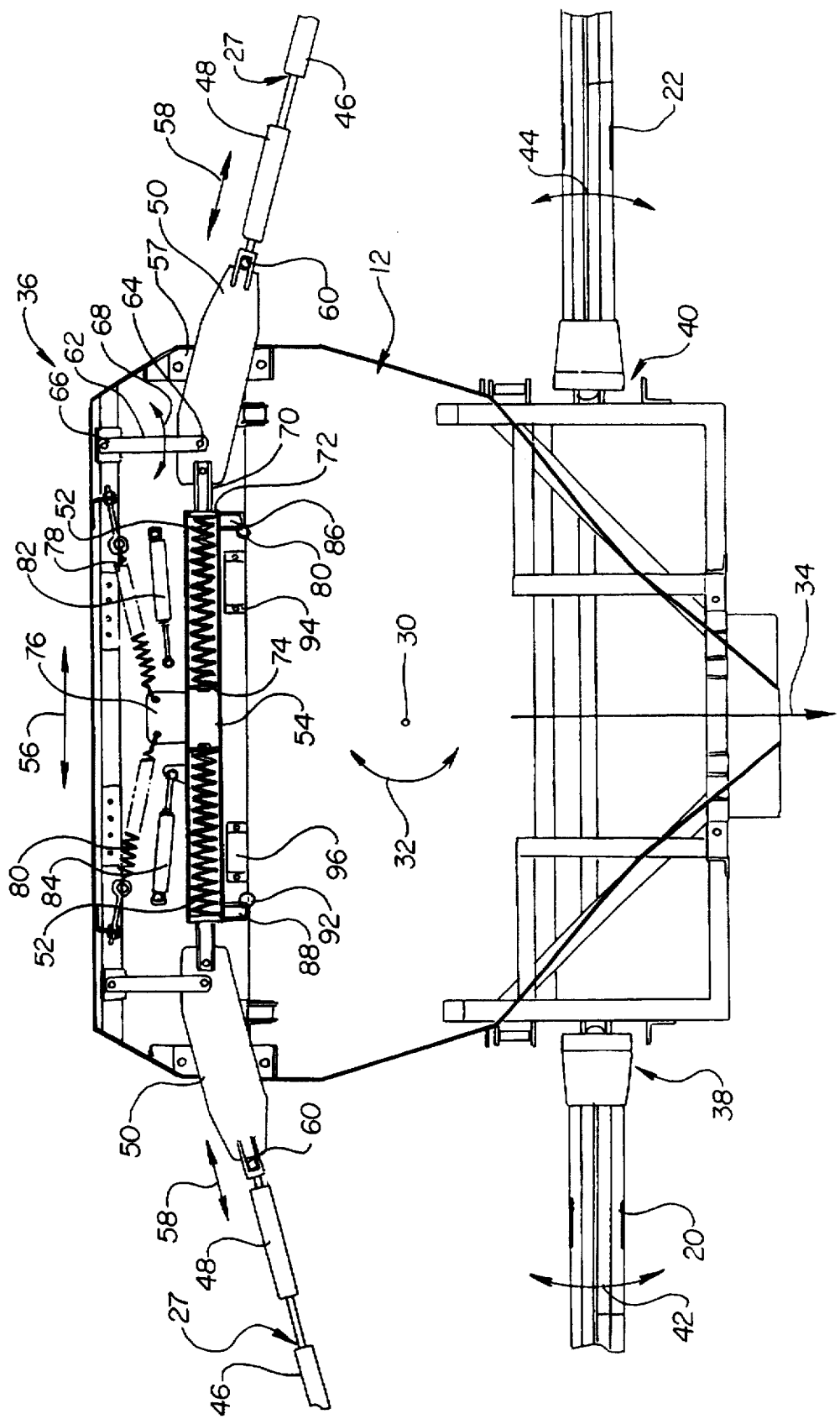

BOOM SUSPENSION ASSEMBLY

BACKGROUND OF THE INVENTION

The present invention deals with mobile spraying or spreading systems. More particularly, the present invention deals with a boom suspension assembly in a spraying/spreading system.

The term "spraying system" is typically used when referring to the application of liquid material. The term "spreading system" is typically used when referring to the application of solid or granular material. The present description is intended to contemplate both systems.

Mobile spraying/spreading systems are used in a wide variety of agricultural and other applications. Such systems typically include a vehicle which is durably built to travel over a wide variety of terrains. The vehicle includes a tank/bin or holding area for holding material to be sprayed or spread. A pump is coupled to boom arms which extend, typically out from both sides of the vehicle. The pump, when energized, pumps the material to be sprayed or spread out through the booms where it is dissipated over desired terrain.

Booms which are commonly used on mobile spraying/spreading systems are relatively rigid. Also, as spraying/spreading systems have developed, booms have become longer to increase the spraying/spreading width obtained with each pass of the vehicle over the field or other terrain.

Because of the rigid nature of the booms, and because of their increased length, certain problems have arisen. For instance, it is not uncommon for the terrain over which the vehicle travels to be rough. When the vehicle hits a bump, the booms are jarred or jerked. This results in the boom material fracturing or rupturing and such booms typically have a very short lifetime.

In an effort to solve this problem, others have attempted to place a pivot point near the center of the boom arms. The pivot point was implemented in an effort to absorb some of the energy or forces imparted on the boom arms as the vehicle traveled through a twisting or rolling motion during travel over rough terrain. Such pivoted boom arms have not proven highly effective.

Still others attempted to develop a boom which was free to "float" from side to side on the vehicle. This was developed in an attempt to allow the boom to remain parallel to the ground, even though the vehicle rolled or twisted about its longitudinal axis due to travel over rough terrain. In other words, if the left side of the vehicle were to encounter a bump in the terrain, the left side of the vehicle would raise up relative to the right side such that the vehicle would essentially roll about its longitudinal axis. With a floating boom system, the boom could purportedly remain essentially parallel with the ground, even while the vehicle was rolling.

However, such systems proved inefficient in avoiding boom breakage for several reasons. For example, when both sides of the vehicle encountered rough terrain (such as when both front wheels went through a ditch which crossed the vehicle travel path in a direction transverse to the vehicle travel path), the vehicle would pitch in a direction generally parallel to its longitudinal axis. With such motion, the boom still reacted as a rigid system and undesirable loads were imparted on the boom arms with no significant ability to dissipate the load.

SUMMARY OF THE INVENTION

A boom assembly is mounted on a vehicle. The vehicle moves along a travel path. First and second boom portions are pivotally attached to the vehicle. A suspension assembly is mounted to the vehicle and movable relative to the vehicle in a direction generally transverse to the travel path. A first suspension arm is coupled to the first boom portion and is resiliently coupled to the suspension assembly. A second suspension arm is coupled to the second boom portion and is also resiliently coupled to the suspension assembly.

BRIEF DESCRIPTION OF THE DRAWINGS

FIG. 3 is an enlarged view of a portion of the boom suspension assembly shown in FIG. 2.

DETAILED DESCRIPTION OF THE PREFERRED EMBODIMENTS

Figure 1:
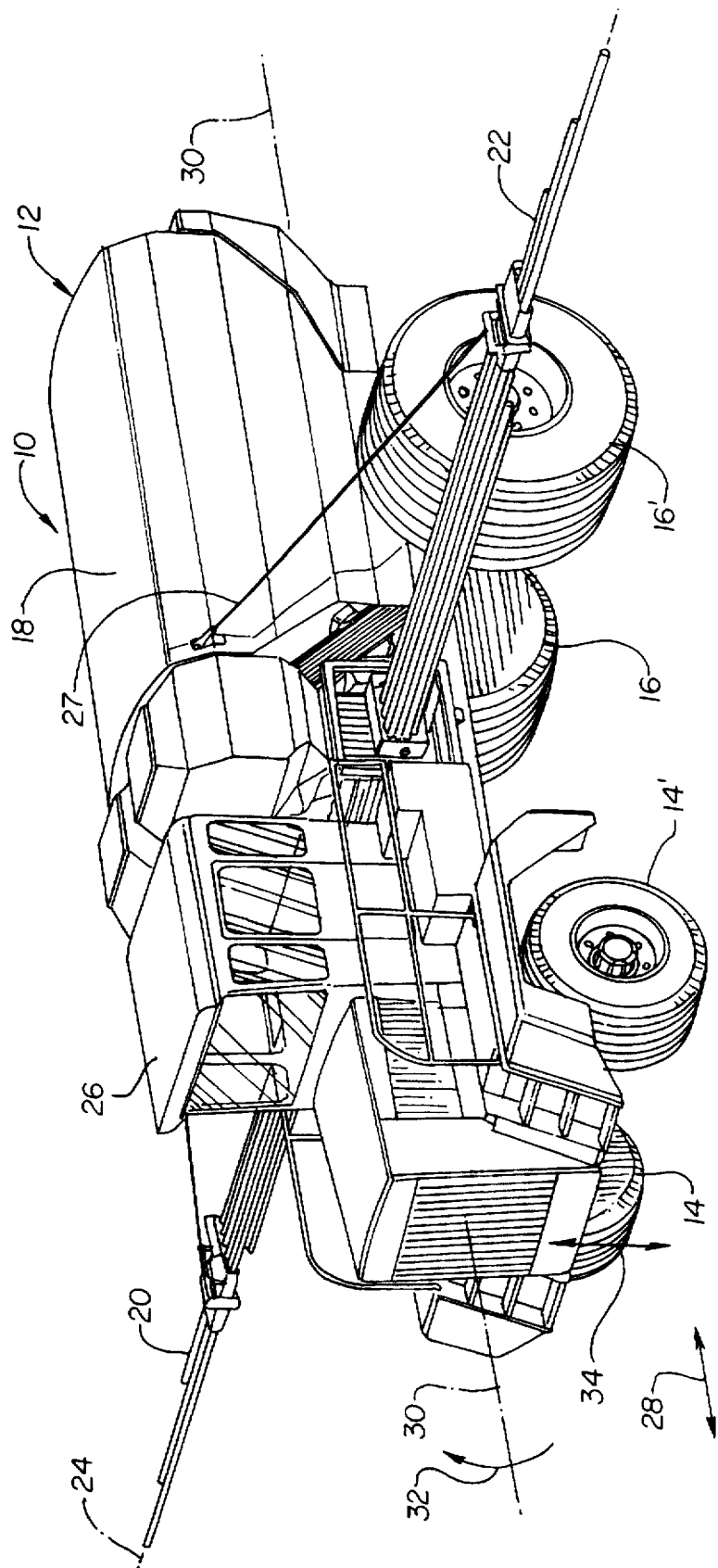
FIG. 1 is a perspective view of a spraying/spreading system according to the present invention.

FIG. 1 is a perspective view of a spraying/spreading system 10 according to the present invention. Spraying/spreading system 10 includes a vehicle 12 preferably supported by a plurality of front wheels 14 and 14' and a plurality of rear wheels 16 and 16'. Vehicle 12 includes a tank/bin 18 which holds material to be sprayed or spread. Vehicle 12 also preferably includes an operator compartment 26 to accommodate a driver or operator of system 10. Vehicle 12 further includes first boom arm 20 and second boom arm 22. In the embodiment shown in FIG. 1, boom arms 20 and 22 are depicted as two rows of four tubes and are generally aligned with one another about a boom axis 24.

Boom arms 20 and 22 are also preferably suspended by a pair of suspension arms 27 (only one of which is shown in FIG. 1, the other being identically disposed on an opposite side of vehicle 12). Also, boom arms 20 and 22 are supported by a suspension assembly which is shown and described in greater detail in FIGS. 2, 3 and 3A–3C.

The vehicle 12 shown in FIG. 1 is a dry fertilizer spreader/sprayer which uses air velocity to transport fertilizer product down the tubes in booms 22 and 24 to a deflector which spreads the fertilizer product on the ground. While the embodiment shown in FIG. 1 shows the boom assembly in the "mid ship" position (i.e., in the middle of the truck) the boom could also be mounted on the front or back of the vehicle. Further, other trucks, tractors or other vehicles could also be used.

Material sprayed or spread by spraying/spreading system 10 typically includes liquid material or dry fertilizers, herbicides, insecticides, or other agricultural materials. It should be noted that such a spraying/spreading system 10 can also be used to spray or spread asphalt, oil, water, or other sprayable/spreadable items.

In operation, vehicle 12 moves generally along a travel path in the direction indicated by arrow 28. Thus, travel path 28 is substantially aligned with a longitudinal axis 30 of vehicle 12. As vehicle 12 is driven along travel path 28, a pump (not shown) pumps the material to be sprayed or spread from tank/bin 18 out through boom arms 20 and 22. As vehicle 12 travels along travel path 28, it is not uncommon for vehicle 12 to encounter rough terrain. Such terrain can take the form of a ridge or rut over which only one side (either left or right) of vehicle 12 travels. In that event, vehicle 12 substantially pivots about longitudinal axis 30. This type of movement is hereinafter referred to as "rolling." For instance, when vehicle 12 travels along travel path 28 and encounters a bump or ridge over which the right hand wheels 14 and 16 travel, but wherein the left hand wheels 14' and 16' do not travel over the bump or ridge, the right hand side of vehicle 12 lifts up relative to the left hand side essentially causing vehicle 12 to roll about an arc indicated by arrow 32. Arc 32 is substantially about the longitudinal axis 30 of vehicle 12.

Vehicle 12 may also encounter a ridge or ditch over which both wheels 14 and 14' travel. In that instance, vehicle 12 pitches in a direction generally transverse to longitudinal axis 30 and generally in a plane containing axis 30. For instance, as vehicle 12 travels along travel path 28 and encounters a ditch which runs transverse to travel path 28, both left and right wheels 14 and 14' travel into the ditch. This causes the front portion of vehicle 12 to move downwardly relative to the rear portion of vehicle 12, generally in the direction indicated by arrow 34. Similarly, if both left and right wheels 14 and 14' encounter a ridge at the same time, the front portion of vehicle 12 moves upwardly (opposite the direction indicated by arrow 34) relative to the rear portion of vehicle 12. This type of motion is hereinafter referred to as "pitching."

The suspension assembly used to mount boom arms 20 and 22 to vehicle 12 is implemented to reduce or dissipate the loads imparted on boom arms 20 and 22 due to both pitching and rolling of vehicle 12. The suspension assembly is described in the remainder of the figures.

Figure 2:
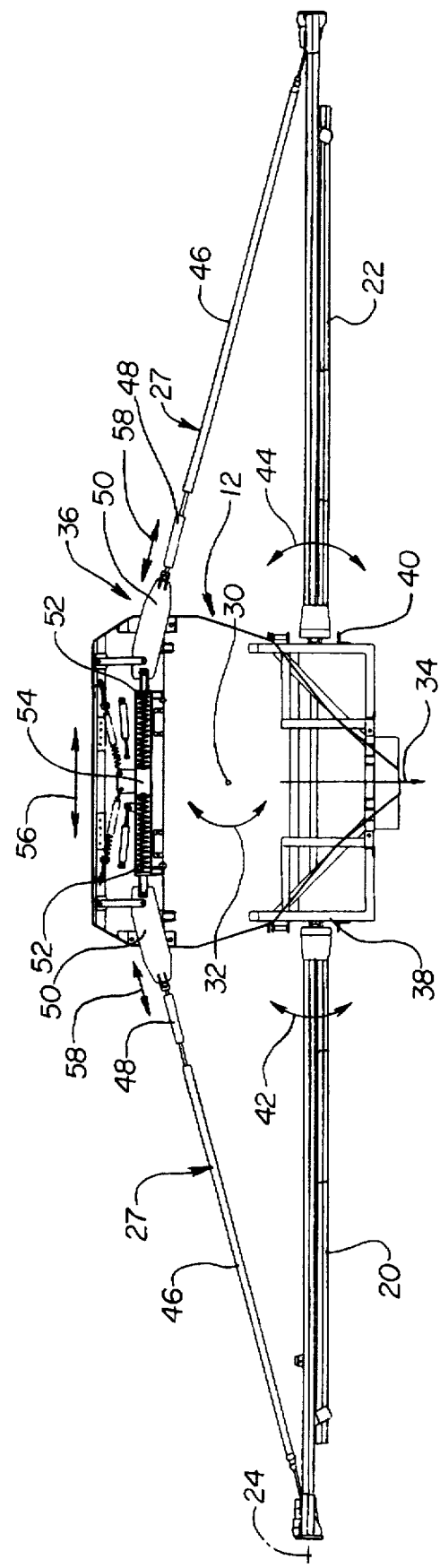
FIG. 2 is a front view of a boom suspension assembly in accordance with the present invention.

FIG. 2 is an illustration of a suspension assembly 36 according to the present invention. A number of the items found in FIG. 2 are similar to those shown in FIG. 1 and are similarly numbered. FIG. 2 illustrates that boom arms 20 and 22 are attached to vehicle 12 at pivot points 38 and 40, respectively. Pivot points 38 and 40 are preferably 2-way pivot points allowing boom arms 20 and 22 to pivot upwardly and downwardly about pivot points 38 and 40, as indicated by arrows 42 and 44, respectively. In addition, pivot points 38 and 40 also are pivotable about an arc which allows boom arms 20 and 22 to be folded rearwardly against the sides of vehicle 12 for transport.

Suspension arms 27 preferably include elongate members 46 attached at their outermost ends to distal portions of boom arms 20 and 22. A pair of hydraulically actuable cylinders 48 are also preferably coupled to elongate members 46 and to the remainder of suspension assembly 36. Cylinders 48 are preferably actuable by manipulating switches within operator compartment 26 of vehicle 12. Cylinders 48, when actuated, cause movement of boom arms 20 and 22, about arcs 42 and 44, respectively. This manipulation allows the operator or driver of vehicle 12 to raise and lower boom arms 20 and 22 to accommodate different terrains over which vehicle 12 is traveling.

Cylinders 48 are coupled, through brace members 50, and through resilient members 52, to suspension tube 54. Suspension tube 54 is configured to swing back and forth in a direction indicated by arrow 56. Also, brace members 50 and resilient members 52 allow suspension arms 27 to, substantially independently, move back and forth in the directions indicated by arrows 58. Brace members 50 are preferably mounted within nylon pads 51 which are securely attached to vehicle 12. Pads 51 provide for easier sliding of brace members 50 relative to vehicle 12.

The two types of movement provided by suspension assembly 36 allow suspension assembly 36 to absorb loads imparted on boom arms 20 and 22 either by pitching or rolling of vehicle 12.

For example, when vehicle 12 rolls about arc 32, suspension tube 54 swings to the left relative to vehicle 12 such that boom arms 20 and 22 remain substantially parallel to the ground even though the body of vehicle 12 rolls. Further, when vehicle 12 pitches, for example by having the front of vehicle 12 move downwardly in the direction indicated by arrow 34, resilient members 52 allow boom arms 20 and 22 to rotate upwardly about arcs 42 and 44, respectively, in order to absorb the forces imparted on boom arms 20 and 22 by vehicle 12 moving downwardly along arrow 34. This latter movement allows boom arms 20 and 22 to move in the same manner as a bird flapping its wings. Thus, suspension assembly 36 significantly minimizes the forces imparted on boom arms 20 and 22 by vehicle 12 pitching or rolling or moving in a manner which results in a combination of pitching and rolling.

FIG. 3 is an enlarged view of suspension assembly 36 shown in FIG. 2. Similar items are similarly numbered. Suspension assembly 36 has two ends which are substantially mirror images of one another. For the sake of clarity, only one end of suspension assembly (the right end in FIG. 3) is described in detail. It will be understood that the other end operates in a similar manner. FIG. 3 shows that cylinder 48 is pivotally coupled to brace member 50 at pivot point 60. Brace member 50 is also pivotally coupled to swing arm 62 at pivot point 64. Swing arm 62, in turn, is pivotally coupled to the frame of machine 12 at pivot point 66. Swing arm 62 is thus capable of swinging about an arc illustrated by arrow 68. Brace member 50 is also coupled to piston 70 which extends inside suspension tube 54.

In the preferred embodiment, suspension tube 54 is a tubular member which has washers 72 securably fastened to the ends thereof. Piston 70 has an outer periphery which is just smaller than the inner aperture of the washers 72. Therefore, cylinder 70 slidably passes through the aperture in washer 72. Cylinder 70 also has a washer 74 (or another type of annular ring) fastened at the end thereof. Resilient member 52 (which is shown in the form of a compression spring in FIG. 3) is mounted over cylinder 70 in the space within suspension tube 54 between washers 72 and 74. As cylinder 70 extends from within suspension tube 54, washers 72 and 74 compress spring 52 therebetween. Thus, spring 52 urges cylinder 70 toward a retracted position.

Suspension tube 54 has an upwardly extending flange 76. Flange 76 is secured by two opposed springs 78 and 80 to the frame of vehicle 12. Also, suspension tube 54 is coupled to vehicle 12 by a pair of oppositely disposed damping members 82. In the embodiment shown in FIG. 3, damping members 82 take the form of air cylinders having the piston thereof connected to suspension tube 54 and the cylinder portion thereof connected to vehicle 12.

Suspension tube 54 also has a pair of bumper members 86 and 88 connected to opposite ends thereof. Bumper members 86 and 88 have rubber bumper strips or pads 90 and 92 which oppose positive stops 94 and 96 which are connected to vehicle 12.

Figure 3A:
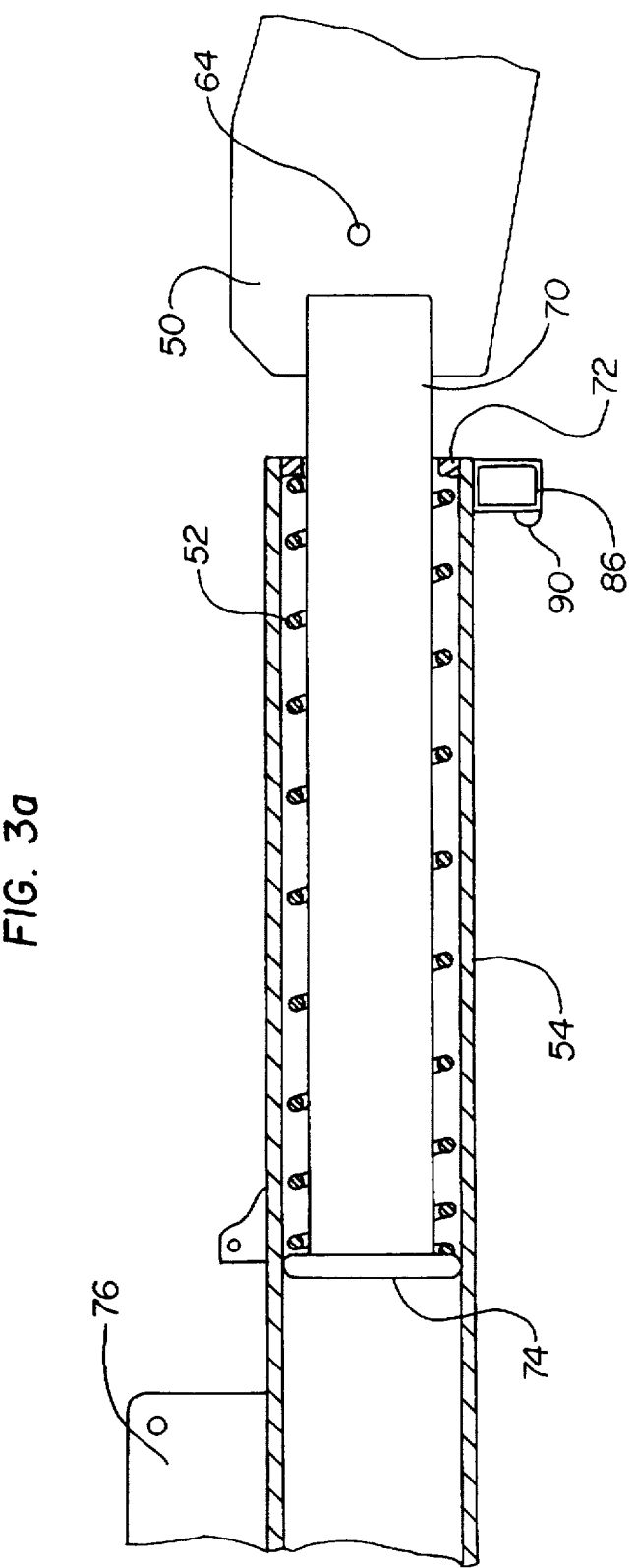
FIG. 3A is a partial sectional view of a portion of the boom suspension assembly shown in FIG. 3.

FIG. 3A is an enlarged partial sectional view of suspension tube 54 showing a number of the items shown in FIG. 3. Similar items are similarly numbered. FIG. 3A better illustrates that plunger 70 preferably extends within spring 52 and that washers 72 and 74 capture spring 52 therebetween to bias plunger 70 toward a desired position.

Figure 3C:
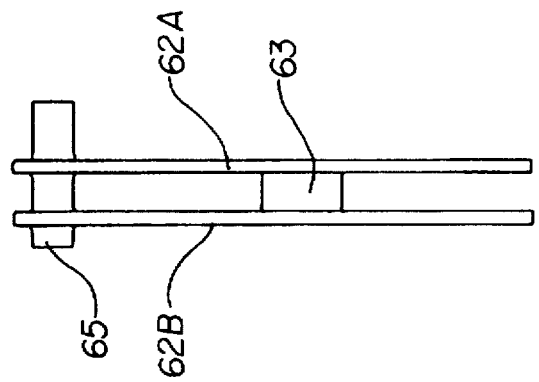
FIGS. 3B and 3C illustrate swing arms used with the boom suspension assembly shown in FIG. 3.
Figure 3B:
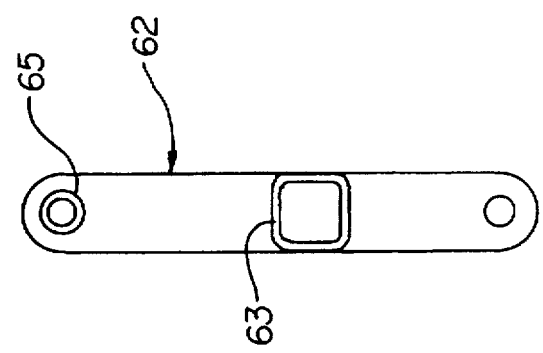

FIGS. 3B and 3C are front and side views, respectively, of a swing arm 62. FIGS. 3B and 3C show that swing arms 62 are preferably formed as a pair of bracketed members 62A and 62B which are offset from one another by a spacer 63. Members 62A and 62B are also pivotally coupled to vehicle 12 through coupling pin 65.

In operation, suspension tube 54 is mounted to swing relative to the frame of vehicle 12 by swing arms 62. Bumpers 92 and positive stops 96 are configured to limit the swing range of suspension tube 54 to a desirable distance. Bias springs 78 and 80 bias suspension tube 54 to a neutral position. Dampers 82 and 84 damp movement of suspension tube 54 and absorb shock and forces imparted on suspension tube 54.

As vehicle 12 moves along the travel path (which is in and out of the page of FIG. 3), boom arms 20 and 22 are preferably substantially aligned parallel with the ground over smooth terrain. However, vehicle 12 may encounter rough terrain which results in vehicle 12 rolling about its longitudinal axis 30 in the direction indicated by arrow 32.

Since booms 20 and 22 are tied together through suspension assembly 36, they tend to balance each other and work together to offset the loads imparted on booms 20 and 22 when vehicle 12 rolls in the direction indicated by arrow 32. In other words, suspension tube 54 is substantially free to move back and forth in the direction indicated by arrow 56 (within the distance limitations imposed by positive stops 94 and 96) to accommodate for rolling of vehicle 12. This maintains booms 20 and 22 substantially parallel to the ground and absorbs a great deal of force which would otherwise be imparted on booms 20 and 22.

However, by providing plungers 70 and springs 52 in conjunction with suspension tube 54, suspension assembly 36 also accommodates for loads imparted on booms 20 and 22 by the vehicle pitching, such as in the direction indicated by arrow 34. Plungers 70 are substantially free to float in and out of suspension tube 54 under the tension applied by springs 52. Brace 50 supports the vertical load of booms 20 and 22. Due to the weight of the booms, piston 70 is always urged outwardly from suspension tube 54 and always compresses spring 52 to some degree to achieve a neutral position. As the truck goes over bumps such that it pitches, springs 52 compress more or less, depending on the magnitude of the load imparted on booms 20 and 22 due to the bump. Since each of the suspension arms 27 are configured in this manner, each boom 20 and 22 can act substantially independently of the other as vehicle 12 goes over ruts or bumps. Therefore, booms 20 and 22 can rotate, substantially independently of one another, about arcs 42 and 44 under loads imparted on the booms when the vehicle pitches.

Suspension assembly 36 absorbs and damps a significant amount of the various loads imparted on booms 20 and 22 during operation of vehicle 12. Suspension assembly 36 thus reduces the loads imparted on booms 20 and 22 both when vehicle 12 pitches and when vehicle 12 rolls. This provides booms 20 and 22 with a softer and smoother ride and significantly lengthens the lifetimes of booms 20 and 22, and lengthens the time between repair of booms 20 and 22.

Although the present invention has been described with reference to preferred embodiments, workers skilled in the art will recognize that changes may be made in form and detail without departing from the spirit and scope of the invention.

What is claimed is:

1. A boom assembly mounted on a vehicle, the vehicle movable along a travel path, the boom assembly comprising:
   a first boom portion pivotally attached to the vehicle;
   a second boom portion pivotally attached to the vehicle;
   a suspension assembly mounted to the vehicle and movable relative to the vehicle in a direction generally transverse to the travel path;
   a first suspension arm coupled to the first boom portion and resiliently coupled to the suspension assembly; and
   a second suspension arm coupled to the second boom portion and resiliently coupled to the suspension assembly;
   a first resilient coupling system resiliently coupling the first suspension arm to the suspension assembly, the first resilient coupling system including a first bias member coupling the first suspension arm to the suspension assembly and urging the first suspension arm toward a first position relative to the suspension assembly;
   a first brace member, pivotally coupled to the vehicle and coupled to the first bias member and the first suspension arm;
   wherein the suspension assembly includes:
      a swing member comprising a suspension tube, the swing member coupled to the first bias member;
      a damper coupled to the swing member to dampen pivotal movement of the swing member relative to the vehicle; and
      a bias system coupled to the swing member and configured to bias the swing member to a desired position along its pivotal movement relative to the vehicle;
   wherein the first bias member comprises:
      a first piston reciprocal within the suspension tube; and
      a first spring urging the first piston toward a desired position relative to the suspension tube.

2. The boom assembly of claim 1 and further comprising:
   a second resilient coupling system resiliently coupling the second suspension arm to the suspension tube.

3. The boom assembly of claim 2 wherein the second resilient coupling system includes a second bias member coupling the second suspension arm to the suspension tube and urging the second suspension arm toward a first position relative to the suspension tube.

4. The boom assembly of claim 3 wherein the second resilient coupling system includes:
   a second brace member, pivotally coupled to the vehicle and coupled to the second bias member and the second suspension arm.

5. The boom assembly of claim 4 wherein the second bias member comprises:
   a second piston reciprocal within the suspension tube; and
   a second spring urging the second piston toward a desired position relative to the suspension tube.

6. A boom assembly mounted on a vehicle that travels along a travel path, the boom assembly comprising:
   a first boom arm pivotally coupled to the vehicle to move through an arc lying in a plane generally transverse to the travel path;
   a second boom arm pivotally coupled to the vehicle to move through an arc lying in a plane generally transverse to the travel path, the first and second boom arms being generally aligned with one another along an axis generally transverse to the travel path; and
   a suspension assembly, pivotally coupled to the vehicle to move in a direction generally transverse to the travel path and being offset from the axis and coupled to the boom arms to allow substantially independent movement of the boom arms along the arc in response to loads imparted on the boom arms during vehicle travel, the suspension assembly comprising:

a transversely movable assembly mounted to the vehicle comprising:
  a suspension tube transversely movably coupled to the vehicle;
  a bias assembly coupled to the suspension tube to bias the suspension tube toward a desired position;
  a damper coupled to the suspension tube to damp relative movement between the vehicle and the suspension tube;
a resilient coupling assembly coupling the first and second boom arms to the transversely movable assembly, the resilient coupling assembly comprising:
  a first suspension arm coupled to one of the first boom arm and the transversely movable assembly;
  a first resilient member coupled to the first suspension arm and to another of the first boom arm and the transversely movable assembly;
  a second suspension arm coupled to one of the second boom arm and the transversely movable assembly; and
  a second resilient member coupled to the second suspension arm and to another of the second boom arm and the transversely movable assembly.

* * * * *